United States Patent
Moore et al.

(10) Patent No.: US 7,856,657 B2
(45) Date of Patent: Dec. 21, 2010

(54) SECURE ACCESS OF RESOURCES AT SHARED APPLIANCES

(75) Inventors: Keith E. Moore, Sunnyvale, CA (US); Mohamed Dekhil, Santa Clara, CA (US); Rajesh K. Shenoy, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 11/589,520

(22) Filed: Oct. 30, 2006

(65) Prior Publication Data

US 2008/0148049 A1    Jun. 19, 2008

(51) Int. Cl.
*H04L 29/06* (2006.01)
*H04L 9/32* (2006.01)
*G06F 15/16* (2006.01)
*H04N 7/16* (2006.01)

(52) U.S. Cl. ............. 726/5; 726/4; 726/7; 726/28; 726/29; 713/168; 709/219; 709/229

(58) Field of Classification Search ............. 726/3–5, 726/7, 26–29; 713/168; 709/217, 219, 229; 705/51; 707/1, 9, 10, 781, 783–785
See application file for complete search history.

(56) References Cited

U.S. PATENT DOCUMENTS

| | | | |
|---|---|---|---|
| 6,202,092 B1 * | 3/2001 | Takimoto | 709/225 |
| 6,378,070 B1 | 4/2002 | Chan et al. | |
| 6,385,728 B1 * | 5/2002 | DeBry | 726/9 |
| 6,678,828 B1 | 1/2004 | Zhang et al. | |
| 6,711,677 B1 | 3/2004 | Wiegley | |
| 6,889,252 B2 | 5/2005 | Lacome D'Estalenx | |
| 6,931,530 B2 | 8/2005 | Pham et al. | |
| 6,952,780 B2 * | 10/2005 | Olsen et al. | 726/26 |
| 7,119,916 B2 * | 10/2006 | Kato et al. | 358/1.15 |
| 7,304,757 B2 * | 12/2007 | Parry et al. | 358/1.15 |
| 7,359,076 B2 * | 4/2008 | Uchino | 358/1.15 |
| 7,409,452 B2 * | 8/2008 | Ragnet et al. | 709/227 |
| 7,620,177 B2 * | 11/2009 | Ibrahim et al. | 380/55 |
| 2005/0240773 A1 | 10/2005 | Hilbert et al. | |

* cited by examiner

*Primary Examiner*—Zachary A Davis

(57) ABSTRACT

An exemplary method for providing secure access to resources at shared appliances comprises obtaining an instruction from a first user to send a resource to a secure repository, the resource being associated with a first identifier, receiving a second identifier from a shared appliance, determining a pseudo identity associated with the shared appliance based on the second identifier, granting to the shared appliance permissions associated with the pseudo identity, including a permission to retrieve the resource from the secure repository, receiving the first identifier from a second user at the shared appliance, and enabling the shared appliance to provide the resource to the second user at the shared appliance.

20 Claims, 5 Drawing Sheets

SECURE ACCESS OF RESOURCES AT SHARED APPLIANCES

BACKGROUND

Many companies have multiple shared appliances at different locations. The shared appliances are generally used by multiple users to obtain various resources. For example, a company may have 50 printers at different locations in multiple offices. When a user wishes to print one of his documents, the user typically enters a print command in a computing device to print the document to a specific printer. However, since the printer is often physically distant from the user initiating the printout, there is a danger that sensitive documents will be collected by some other individual either accidentally or maliciously.

To overcome this privacy concern, secure printing techniques have been created.

However, these techniques suffer from at least two potential issues: (1) handling printer jams/toner outages; and (2) exposure of credentials. In the case of paper jams or toner outages, the user arrives at the printer to discover the printer is disabled and the print job is stuck somewhere in the printing infrastructure. Since the printer is distant in time and location from the initiation and location of initiation of the print job, it is often difficult or impossible to recreate the print job for another printer. In the case of exposure of credentials, it is possible that the printer itself (particularly in an environment like a hotel or airport) cannot be trusted and entering the full user credentials would be unsafe.

Thus, a market exists for a method to provide secure access of resources at shared appliances that improves trustworthiness of each shared appliance and safeguards against access by unauthorized users.

SUMMARY

An exemplary method for providing secure access to resources at shared appliances comprises obtaining an instruction from a first user to send a resource to a secure repository, the resource being associated with a first identifier, receiving a second identifier from a shared appliance, determining a pseudo identity associated with the shared appliance based on the second identifier, granting to the shared appliance permissions associated with the pseudo identity, including a permission to retrieve the resource from the secure repository, receiving the first identifier from a second user at the shared appliance, and enabling the shared appliance to provide the resource to the second user at the shared appliance.

Other embodiments and implementations are also described below.

DETAILED DESCRIPTION

I. Overview

Exemplary processes and systems for providing secure access of resources at shared appliances are described.

Section II describes an exemplary system for providing secure access of resources at multiple shared appliances.

Section III describes exemplary processes for providing secure access of resources at a shared appliance.

Section IV describes an exemplary implementation for providing secure access of documents at a printer.

Section V describes exemplary applications.

Section VI describes an exemplary computing environment.

Figure 1:
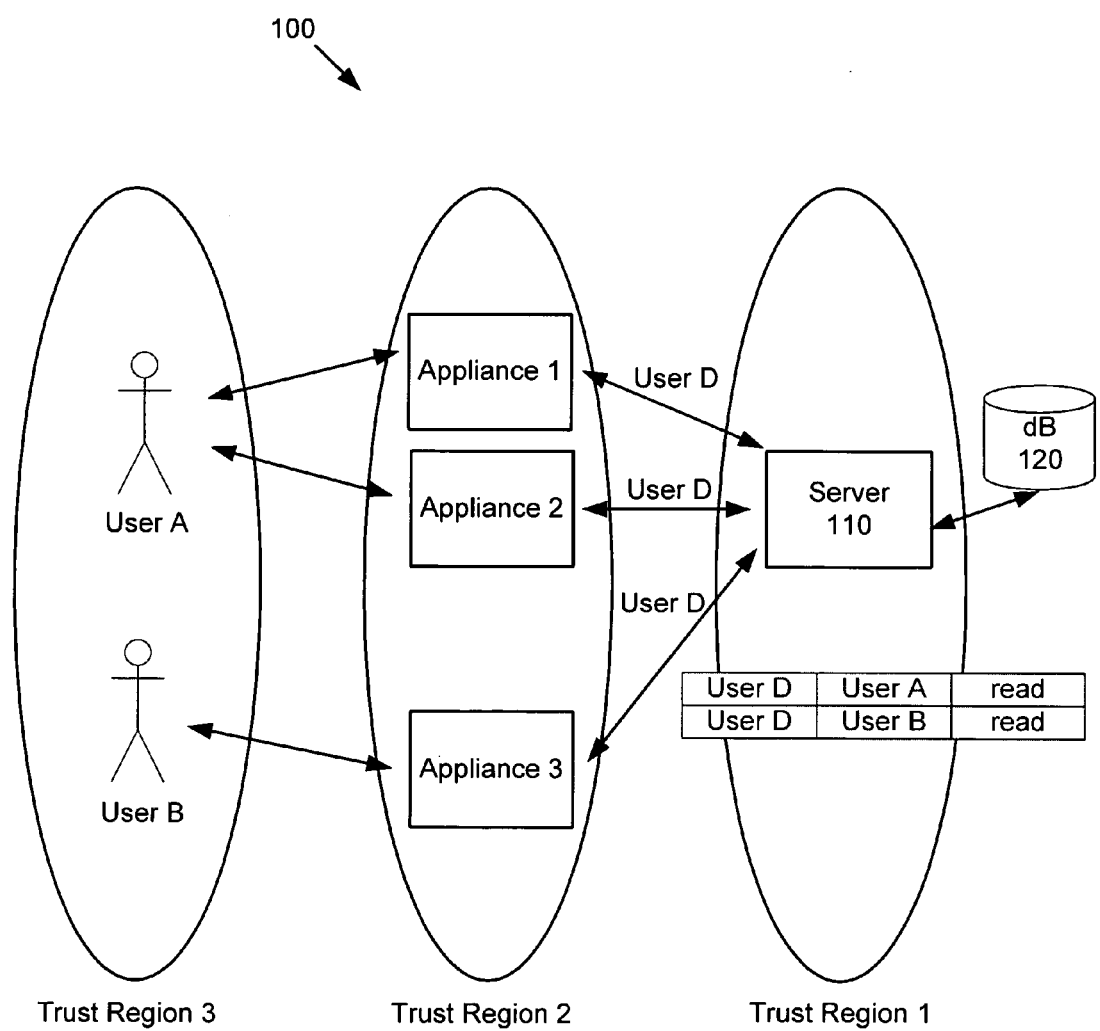
FIG. 1 illustrates an exemplary system for providing secure access of resources at multiple shared appliances.

II. An Exemplary System for Providing Secure Access of Resources at Multiple Shared Appliances FIG. 1 illustrates an exemplary system 100 for providing secure access of resources at multiple shared appliances. Appliances may include, without limitation, any machine or device (domestic appliance, electrical device, etc.) able to provide resources to one or more users. Types of resources may include, without limitation, hardcopy documents, softcopy files, any other form of content, etc.

The exemplary system 100 includes three trust regions. Trust region 1 includes a server 110 logically coupled to a database 120. The database 120 may be an internal or an external database that is accessible to the server 110. The database 120 stores data and information (e.g., about users, resources, and/or other information). For example, the information may include a list of users, one or more identifiers, and/or information relating to the appliances. Exemplary processes for registering users and appliances will be described in more detail below with reference to FIGS. 2 and 3. In an exemplary implementation, trust region 1 is a trusted domain implemented as a Microsoft® Windows Domain or using any other identity certification system known in the art (e.g., PKI).

Trust region 2 includes multiple shared appliances and applications running on the appliances under pseudo identities. For ease of illustration, only three appliances are shown in FIG. 1. In actual implementation, any number of appliances, whether or not the same type of appliance, may be included in the trust region 2. In an exemplary implementation, each class of appliances (e.g., printers, television sets, scanners, cameras, etc.) is assigned a pseudo identity having its own identifier. For example, all the printers at the Hewlett-Packard Company may be assigned the pseudo identity of "HP printing assistant." In one implementation, every shared appliance having the same pseudo identity uses the same unique identification credential to become recognized in the trusted domain of trust region 1. In FIG. 1, the pseudo identity assigned to all three appliances is "user D."

One skilled in the art will recognize that, depending on design choice or specific implementations, the server 110 and/or database 120 in trust region 1 may comprise multiple servers and/or databases in overlapping or disjoint trust regions. In the case of disjoint trust regions, each shared appliance may include selection logic to enable it to select a pseudo identity (e.g., from a set of pseudo identities) that is known to one or more server and/or database for requesting access to any particular resource. In an exemplary implementation, the selection logic may be based on an identifier provided by a user at a shared appliance.

Trust region 3 includes multiple users. The users may delegate limited rights (e.g., only read rights for accessing the user's resources) to the pseudo identities in trust region 2.

This information can be stored in the database 120. For example, in trust region 1, the server 110 may access the database 120 to determine that user D is permitted to read documents that can be provided to both user A and user B.

At least some of the users may be pre-registered. Registered users may provide billing information (e.g., credit card numbers) to the server 110 to enable the server to bill the users for resource retrieval at the shared appliances. Other users may use pre-paid cards (such as RFID cards) that identify accounts that are debited when retrieving documents and/or other payment methods.

The three trust regions illustrated in FIG. 1 are merely exemplary. A person skilled in the art will recognize that more (or fewer) trust regions may be implemented depending on design choice, including a desired security level.

Figure 2:
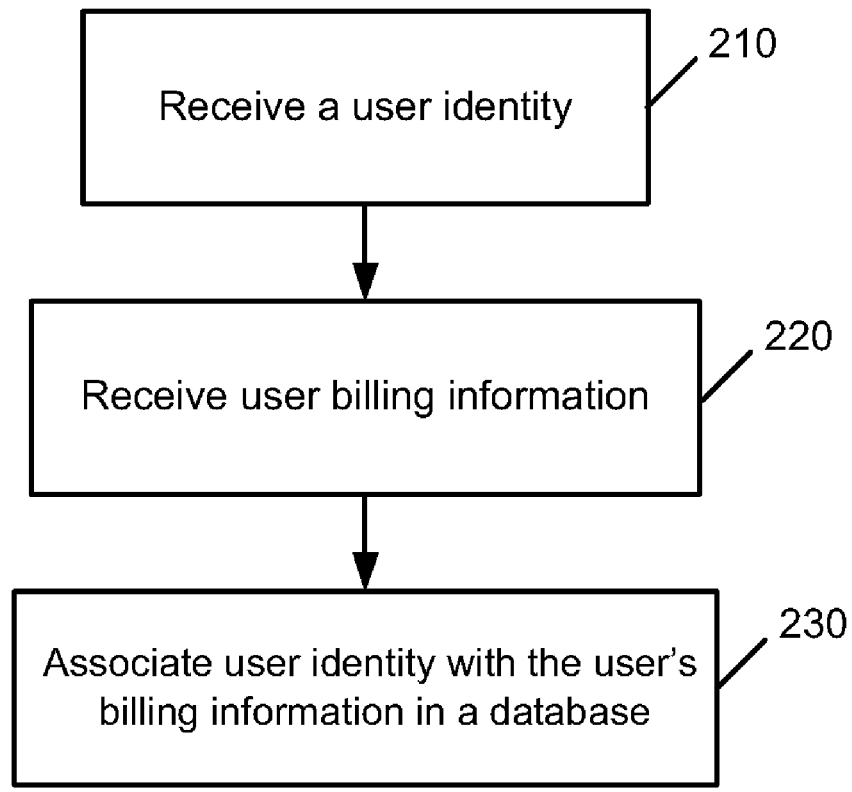
FIG. 2 illustrates an exemplary process for registering users.

FIG. 2 illustrates an exemplary process for registering a user. User registration is optional. Registration can be used to implement a billing mechanism to collect fees (or debit prepaid accounts) for providing convenient resource retrieval services.

At step 210, a user identity (e.g., name, username, and/or other login credential, etc.) is received by a server. In an exemplary implementation, a user may name his/her own identity or an identity may be assigned by the server (e.g., user #1234).

At step 220, user information for billing purposes is received. For example, the information may include credit card numbers, expiration date, bank routing and account numbers, and/or other payment sources.

At step 230, the user's identity is associated with the user's billing information in a database (e.g., the database 120) using known mapping technology (e.g., LDAP database, etc.).

Figure 3:
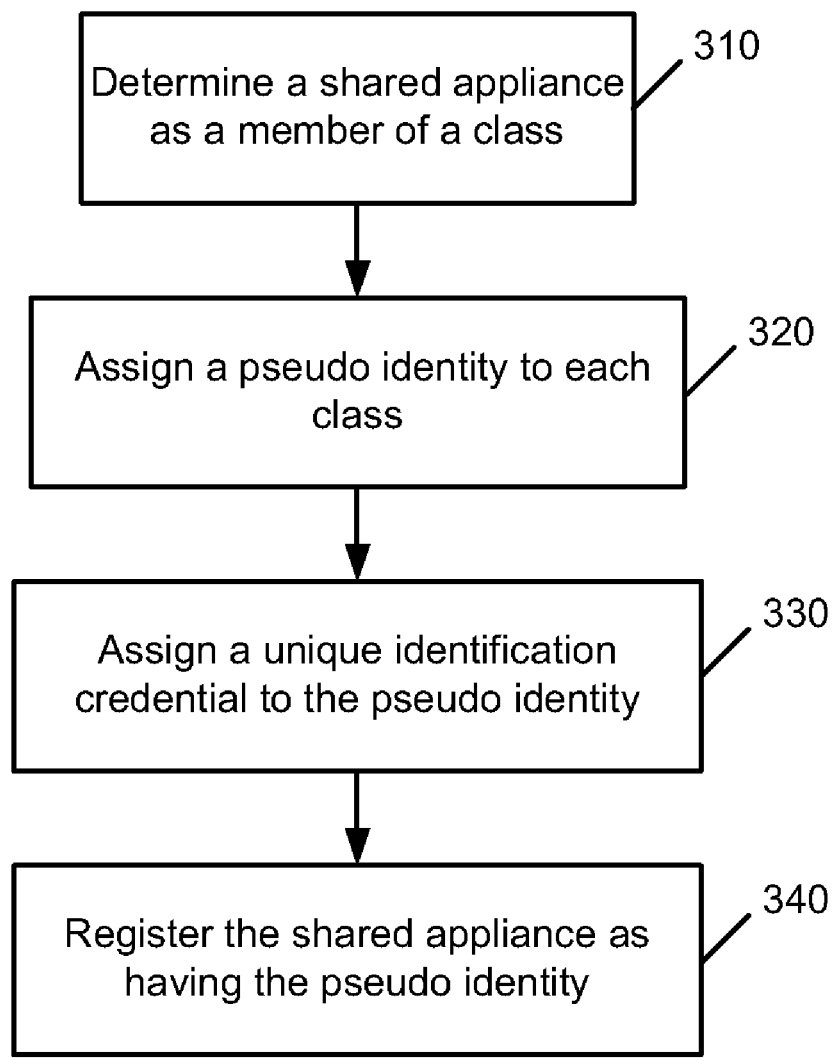
FIG. 3 illustrates an exemplary process for registering shared appliances.

FIG. 3 illustrates an exemplary process for registering a shared appliance.

At step 310, a shared appliance is determined to be a member of a class of appliances.

At step 320, each class is assigned a pre-determined pseudo identity. For example, the class that includes printers at a library may be assigned the pseudo identity of "library printing assistant." Each pseudo identity typically has an associated (or pre-assigned) level of permissions. Depending on design choice, the pseudo identity may be selected from a list of pre-determined identities, determined dynamically, and/or otherwise derived based on different factors (e.g., location, device capability, company name, etc.). A person skilled in the art will recognize that any known credential authentication process (e.g., Microsoft User Domain authentication or UNIX UID/passwords, etc.) can be implemented to effect the pseudo identity and role-based security of different classes of shared appliances.

At step 330, a unique identification credential is assigned to the pseudo identity.

At step 340, the shared appliance is registered as having the pseudo identity. Thus, multiple appliances may have the same pseudo identity and can each contact the trusted domain using the same identification credential.

Any user may request to send a resource (e.g., request to print a document to a printer) to a secure repository accessible by the server in order to make the resource accessible by any registered shared appliance. Each sent resource is associated with at least one identifier or key that is known to a user who will be collecting the resource. The identifier may or may not be a default identifier. For example, the identifier may be a one-time key that is communicated (e.g., out-of-band) by the first user to a second user, who is collecting the sent resource.

In this example, the second user then presents the identifier associated with the resource at a shared appliance to obtain that resource.

In an exemplary implementation, the appliance first identifies itself to the server 110 using its assigned identification credential for proving its pseudo identity. In another implementation, the appliance may establish its pseudo identity prior to the current transaction with the second user. Once its pseudo identity has been proven, the appliance presents the identifier provided by the second user to the server 110 to request permission to fetch the requested resource for the second user.

Figure 4:
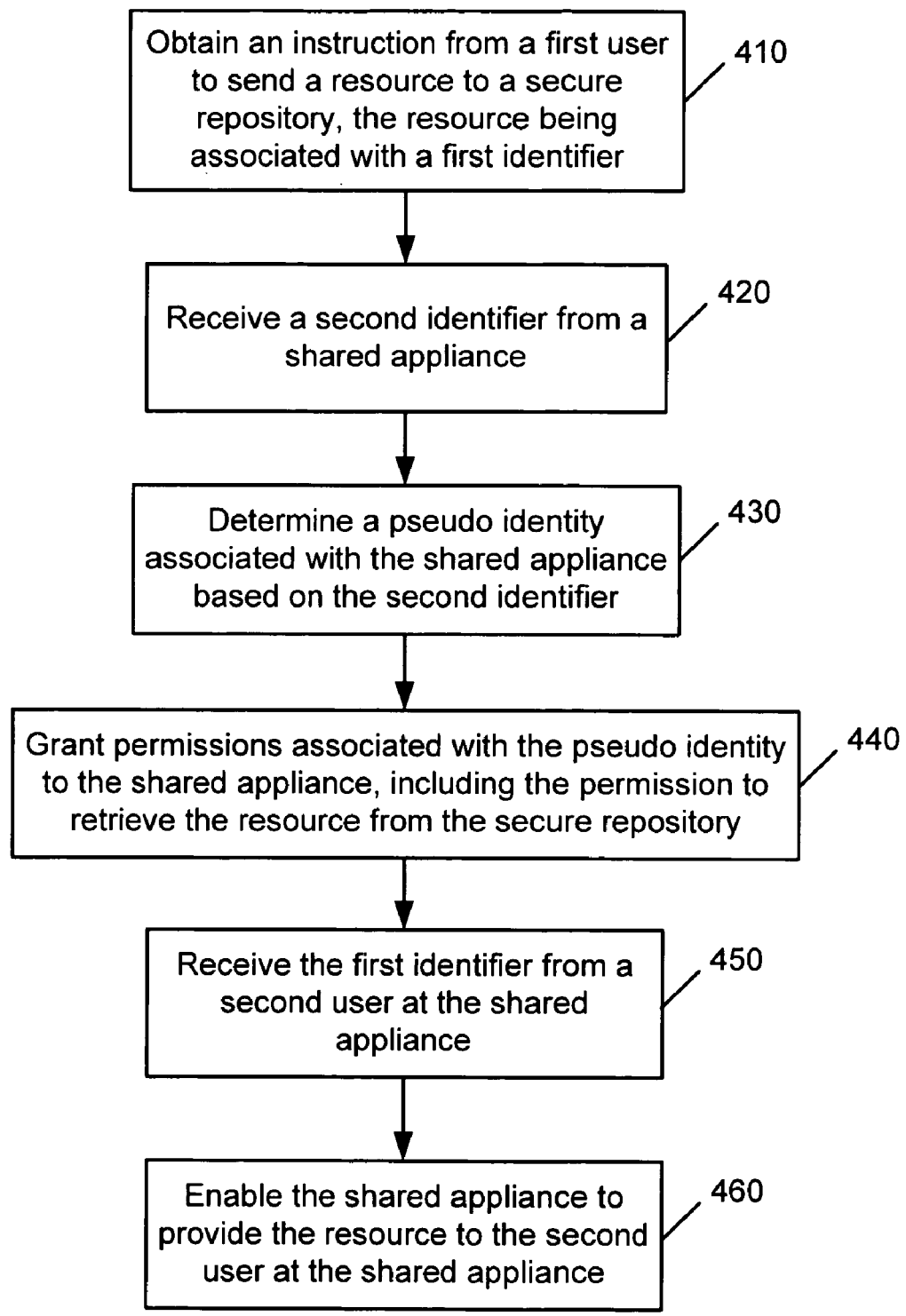
FIG. 4 illustrates an exemplary process for providing secure access of resources.

III. An Exemplary Process for Securely Providing Resources at a Shared Appliance FIG. 4 illustrates an exemplary process for securely providing resources at a shared appliance.

At step 410, an instruction to send a resource is received from a first user by a server (e.g., server 110). In an exemplary implementation, the resource is requested to be sent to a secure repository accessible by the server. The requested resource is associated with a first identifier. For example, the first user may select an identifier from a pull-down menu or a directory, manually enter an identifier, or otherwise generate or obtain an identifier. The first identifier may include, without limitation, one or more of the following: a badge, a fingerprint, a password, a PIN code, credit card numbers, and/or any other form of identifier or key.

At step 420, a second identifier is received from a shared appliance. In an exemplary implementation, the second identifier is an assigned identification credential for identifying the shared appliance as a member of a class identified by a pseudo identity. For example, if the shared appliance is a printer, it may present an assigned identification credential for identifying itself as a "printing assistant." In one implementation, the shared appliance may identity itself to the server (by providing the second identifier) prior to the current transaction or it may identify itself at the beginning of each transaction. The identification process can be performed locally at the shared appliance or remotely (e.g., at the server or the secure repository).

At step 430, the pseudo identity of the shared appliance is determined based on the second identifier. For example, the unique identification credential provided by the shared appliance is matched to a pre-determined pseudo identity. In an exemplary implementation, the shared appliance may be configured to be dedicated to a single server with a pre-determined pseudo identity. In another exemplary implementation, the shared appliance may be configured to be able to select a different server (or database) from a set of servers by providing an appropriate identifier to the selected server (i.e., an identifier of a pseudo identity known to the selected server) at the beginning of the next transaction. The selection logic for determining which server to select may be based on the identifier to be presented to the shared appliance by the second user. In another implementation, the selection logic may be pre-programmed into the shared appliance.

At step 440, permissions associated with the determined pseudo identity are granted to the shared appliance. In an exemplary implementation, the permissions include the permission to retrieve the resource from the secure repository. An example of an additional permission would be the ability to fetch an authoring document or web page and convert that document into a format appropriate to the shared device (e.g., rasterize the document). In this example, the shared appliance may inform the server and/or database about the type of resource format(s) the appliance is capable of accepting.

At step 450, the first identifier is received from a second user at the shared appliance. The second user may or may not be the same entity as the first user. In an exemplary implementation, if the first and second users are not the same entity, the first identifier may be communicated by the first user to the second user. The communication may be verbal (e.g., in person, via the telephone, via the cellular phone, etc.), electronic text (e.g., via a computing device over a network, etc.), written text (e.g., via a hardcopy paper, etc.), and/or through any other in-band or out-of-band communication means. In another exemplary implementation, the second user may already know the first identifier (e.g., a shared secret, a default value, previously communicated identifier, etc.). In an exemplary implementation, the shared appliance includes a receptacle, a keyboard, a magnetic or RF id reader, and/or other means for receiving the first identifier.

At step 460, the shared appliance is enabled to retrieve the resource from the secure repository and provide it to the second user. In an exemplary implementation, the resource is decoded prior to being provided to the second user. For example, the resource may have been encoded and has to be decoded before the shared appliance can render the resource useable to the second user. In an exemplary implementation, the first identifier may also be used to decode the resource. In another exemplary implementation, depending on the desired level of security, the second user may be prompted to enter (or otherwise provide unprompted) a separate key to decode the resource. The decoding can be performed locally at the shared appliance or remotely (e.g., at the server, secure repository, etc.). If decoding is done remotely, the transmission of the decoded resource to the shared appliance may be encrypted using known encryption technology (e.g., SSL).

In addition, in one implementation, the resource to be provided may be marked to indicate the identity of the second user. This way, any unauthorized copying or dissemination of the resource may be traceable. For example, the resource may be marked with a watermark, variable spacing, half-tone algorithms, a barcode, and/or other marking techniques known in the art.

The process described above is merely exemplary. A person skilled in the art will recognize that other process steps may be implemented to securely provide resources at a shared appliance.

Figure 5:
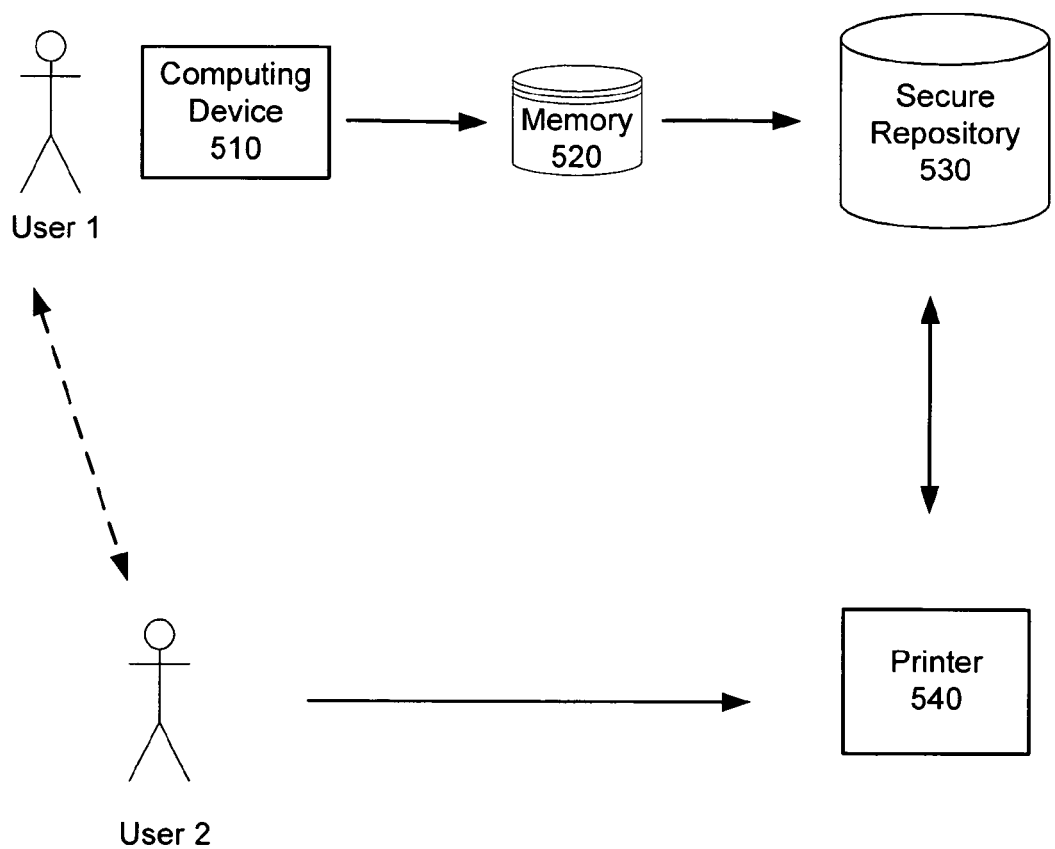
FIG. 5 illustrates an exemplary implementation for providing secure access of documents at a shared printer.

IV. An Exemplary Implementation for Providing Secure Access of Resources at a Printer FIG. 5 illustrates an exemplary implementation for providing secure access of resources. In this exemplary implementation, the resources to be accessed are documents and the shared appliance is a printer. In this example, User 1 is not the same entity as User 2. A person skilled in the art will recognize that the example described is equally applicable if User 1 is the same entity as User 2.

User 1 provides an instruction to a server (not shown) via a computing device 510 to print a document and associate that document with a first identifier (e.g., User 2's badge number). In an exemplary implementation, User 1 may select User 2's email address from a pull-down menu to be associated with the document. The email address then may be translated by the server to User 2's badge number. The requested document is fetched from a memory 520 and sent to a secure repository 530.

In an exemplary implementation, User 1 communicates to User 2 using an out-of-band network (indicated by the dashed line) that the document has been sent to the secure repository 530. User 1 may also inform User 2 about the identifier needed to access the document at the printer 540, the key needed to decode the document, and/or other information.

At a later time, User 2 walks up to the printer 540 and presents his badge number. The printer 540, if not already authenticated, will first present its own identifier to identify itself to the server and/or secure repository 530. For example, the printer 540 may present the credentials assigned to the pseudo identity of a "printing assistant." After the printer 540 has been identified, it may be treated as a member of the trusted domain of the secure repository and uses the permissions of the pseudo identity. The printer 540 then presents the first identifier provided by User 2 to request permission to fetch the requested document from the secure repository 530. If the first identifier matches the identifier associated with the document, then the printer 540 is granted permission to fetch the document for User 2. The printer 540 fetches the document and provides it to User 2. In an exemplary implementation, the document may be decoded prior to being provided to User 2 (either by a key known at the shared device or by a key provided by User 2). One skilled in the art will appreciate that the first identifier may comprise two identifiers, the first being a decoding key and the second part being the identifier for identifying the desired resource.

In the case where multiple resources are identified by the same identifier, the user may be prompted to select from the available resources or by default all such resources will be retrieved.

The process described above is merely exemplary. A person skilled in the art will recognize that other resources can be securely accessed at other shared appliances based on the exemplary process steps.

V. Exemplary Applications

The secure resource access described herein may be applicable to many different scenarios. Two examples will now be described in this Section. These examples are provided for illustration purposes only. The invention should not be limited to any exemplary implementations described herein.

A. Securely Print Documents Anywhere

The exemplary implementation illustrated in FIG. 5 may be useful for enabling secure printing anywhere. For example, an airport may be equipped with printers. The airport may have a contractual agreement with a service provider for enabling registered users of the service provider to securely print documents at any of the airport's printers. In one implementation, all the printers at the airport may be assigned a pseudo identity of "airport printing assistant" and a unique identification credential associated with the pseudo identity. As a result, any of the airport printers may request permission to fetch documents stored at a secure repository under the service provider's control to print to any registered user authorized to obtain the documents. When an airport printer is identified by its pseudo identify "airport printing assistant" (i.e., by presenting its unique identification credential associated with the pseudo identity), it can be treated as a member of the same trusted domain as the secure repository.

In this example, a registered user at the airport can enter a print command on his laptop computer, walk up to the nearest airport printer, provide an identifier which he has associated with the document, then obtain the printed document from the printer. The backend authentication processes can be completely transparent to the user.

B. Securely View Pre-paid Movies Anywhere

The exemplary system described herein may be implemented to provide secure access to pre-paid movies anywhere. For example, a hotel may have a contractual agreement with a service provider for enabling registered users of the service provider to securely view pre-paid movies at the hotel. In this example, a user may have a paid cable TV subscription at his home. When the user travels, he may wish to view the movies he had already pre-paid as part of his home subscription at the hotel television set without having to pay yet another fee to the hotel.

In an exemplary implementation, the user or a family member may send the pre-paid movie to a secure repository. When the user is ready to view the movie at the hotel, the user walks up to the television set at the hotel and presents an identifier associated with that movie. The television set then identifies itself to the server or secure repository using its identifier associated with a previously assigned pseudo identity. Once identified, the television set may submit the identifier provided by the user to request permission to fetch the pre-paid movie and play the movie to the user. Of course, the television set may be substituted by any other suitable appliance (e.g., a set top box, etc.).

VI. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of non-transitory computer-readable medium which can store data and logic instructions that are accessible by the computer or the processing logic. Such non-transitory media might include, without limitation, hard disks, floppy disks, magnetic cassettes, flash memory cards, digital video disks, removable cartridges, random access memories (RAMs), read only memories (ROMs), and/or still other non-transitory electronic, magnetic and/or optical media known to those skilled in the art or hereafter developed.

VII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method, comprising:
   in response to a request from a first user, storing a resource in a secure repository, said resource being associated with a first identifier;
   receiving a second identifier from a shared appliance;
   authenticating said shared appliance as a member of a class of appliances based on the second identifier;
   in response to said authentication, granting to said shared appliance permissions associated with said class of appliances, including a permission to retrieve said resource from said secure repository;
   receiving said first identifier from a second user at said shared appliance; and
   in response to said first identifier, enabling said shared appliance to provide said resource to said second user at said shared appliance only if said shared appliance has been authenticated.

2. The method of claim 1, further comprising:
   registering a plurality of shared appliances as members of classes of appliances.

3. The method of claim 2, wherein said registering includes:
   assigning a pseudo identity to each class of shared appliances;
   assigning a unique identification credential to each pseudo identity; and
   providing said unique identification credential to each shared appliance that is registered as a member of said corresponding class of shared appliances, wherein said second identifier includes said unique identification credential and said authentication is based on said unique identification credential.

4. The method of claim 1, further comprising selecting a particular server of a plurality of servers to retrieve the resource from the secure repository, wherein said shared appliance is enabled to select said particular server based on said first identifier.

5. The method of claim 4, further comprising:
   registering said shared appliance as a member of each of a plurality of classes of shared appliances; and
   providing a plurality of unique identification credentials to said shared appliance, wherein each provided unique identification credential corresponds to a class of said plurality of classes of shared appliances of which said shared appliance is a member,
   wherein said selecting of a particular server comprises selecting a particular unique identification credential of said plurality of provided unique identification credentials to provide to said particular server based on said first identifier.

6. The method of claim 1, further comprising:
   registering a plurality of users.

7. The method of claim 6, wherein said registering includes:
   obtaining billing information from each user.

8. The method of claim 1, wherein said first user is the same entity as the second user.

9. The method of claim 1, wherein said enabling includes decoding said resource using an identifier.

10. The method of claim 9, wherein said decoding is performed at a remote location from said shared appliance.

11. The method of claim 9, wherein said decoding is performed at said shared appliance.

12. The method of claim 1, further comprising marking said resource provided to said second user at said shared appliance to identify the second user as the recipient of the resource.

13. The method of claim 1, wherein said first user communicates the first identifier to the second user via an out-of-band network.

14. A system, comprising:
a secure repository;
a plurality of shared appliances;
a processor logically coupled to said secure repository and said shared appliances;
said processor being configured to execute instructions stored in a memory to:
send a resource to said secure repository in response to a request from a first user, said resource being associated with a first identifier;
receive a second identifier from a first shared appliance of said plurality of shared appliances;
authenticate said first shared appliance as a member of a class of appliances based on said second identifier;
grant to said first shared appliance permissions associated with said class of appliances, including a permission to retrieve said resource from said secure repository;
receive said first identifier from a second user at said first shared appliance; and
provide said resource to said second user at said first shared appliance only if said first shared appliance has been authenticated.

15. The system of claim 14, wherein said processor is further configured to execute instructions stored in a memory to:
assign a unique identification credential to each class of a plurality of classes of shared appliances;
register said first shared appliance as a member of at least one of said plurality of classes;
provide to said first shared appliance said unique identification credentials corresponding to said plurality of classes of shared appliances of which said shared appliance is a member; and
select a server of a plurality of servers to retrieve said resource by selecting a particular unique identification credential of said provided unique identification credentials to provide to said server, wherein said selection of said particular unique identification credential is based on said first identifier.

16. The system of claim 14, wherein said providing said resource includes decoding said resource using said first identifier and marking said resource provided to said second user at said first shared appliance to identify said second user as the recipient of said resource.

17. A non-transitory computer-readable medium, comprising logic instructions that, if executed, cause a processor-based device to:
associate a resource in a secure repository with a first identifier in response to a request from a first user;
receive a second identifier from a shared appliance;
authenticate said shared appliance based on said second identifier;
grant to said shared appliance permissions associated with said authentication, including a permission to retrieve said resource from said secure repository;
receive said first identifier from a second user at said shared appliance; and
enable said shared appliance to provide said resource to said second user at said shared appliance only if said shared appliance has been authenticated.

18. The non-transitory computer-readable medium of claim 17, further comprising logic instructions that, if executed, cause the processor-based device to:
assign a unique identification credential to each class of a plurality of classes of shared appliances;
register said shared appliance as a member of at least one of said plurality of classes;
provide to said shared appliance said unique identification credentials corresponding to said plurality of classes of shared appliances of which said shared appliance is a member; and
select a server of a plurality of servers to retrieve said resource by selecting a particular unique identification credential of said provided unique identification credentials to provide to said server, wherein said particular unique identification credential is selected based on said first identifier.

19. The non-transitory computer-readable medium of claim 17, further comprising logic instructions that, if executed, cause the processor-based device to:
decode said resource using said first identifier.

20. The non-transitory computer-readable medium of claim 17, further comprising logic instructions that, if executed, cause the processor-based device to:
mark said resource provided to said second user at said shared appliance to identify said second user as the recipient of said resource.

* * * * *